Dec. 20, 1949     H. M. TEAGUE     2,491,879

TERMINAL CONSTRUCTION

Filed March 8, 1945

INVENTOR.
Hubert M. Teague
BY
Henry Lanahan
ATTORNEY

Patented Dec. 20, 1949

2,491,879

UNITED STATES PATENT OFFICE 2,491,879

TERMINAL CONSTRUCTION

Hubert M. Teague, Bloomfield, N. J., assignor to Thomas A. Edison, Incorporated, West Orange, N. J., a corporation of New Jersey Application March 8, 1945, Serial No. 581,666

3 Claims. (Cl. 136—135)

This invention relates to improved terminal constructions for batteries. As a preferred illustrative example, the invention is herein described in connection with a primary battery of the zinc anode, alkaline electrolyte, air-depolarized type.

Objects of my invention are to provide an improved lead-through terminal construction adapted for mounting on battery containers which is hermetically sealed and arranged so that the terminal per se is effectively isolated from contaminating elements of the batteries.

It is a further object to provide a terminal construction wherein the terminal per se is separated from the lead-through conductor by a conductive non-amalgamating means, and it is especially an object in this respect to provide an improved terminal construction for amalgamated electrodes of primary batteries wherein the terminal per se is effectively isolated from contact with mercury of the battery electrode.

It is another object to provide a terminal construction of the character described which may be preassembled with the cover of the electrical device and be then electrically connected and hermetically sealed after the cover is mounted on the container.

A further object is to provide a simple and economical construction of terminal arrangement for electrical devices wherein the aforestated objectives are fulfilled.

Other and allied objects and features of my invention will more fully appear from the following description and the appended claims.

In the description of my invention reference is had to the accompanying drawings, of which:

Figure 1:
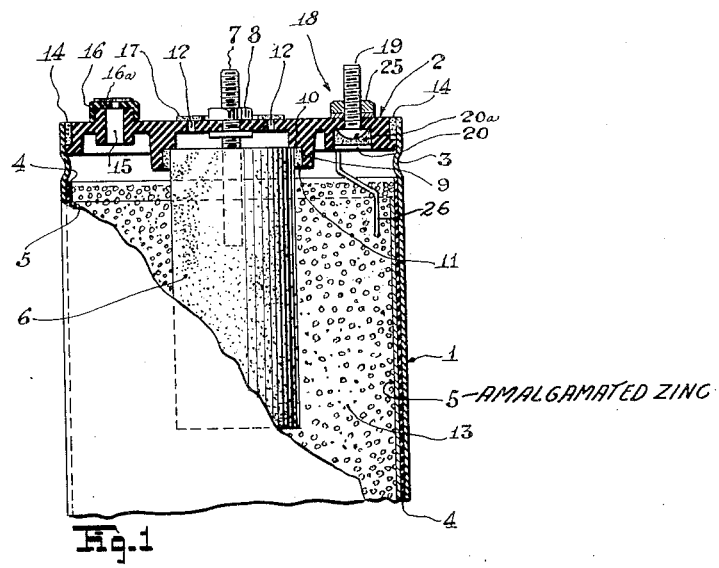
Figure 1 is a principally axial sectional view of a primary battery in which my invention is incorporated.
Figure 2:
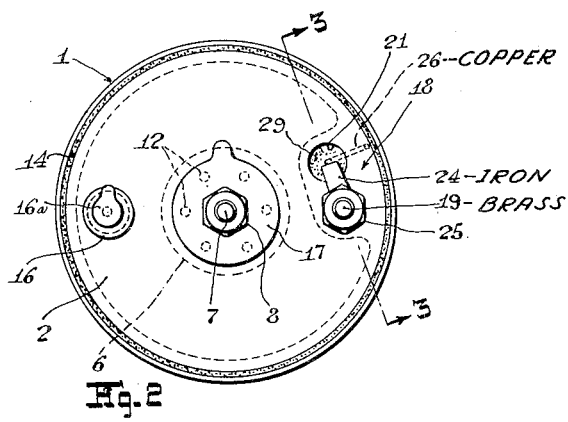
Figure 2 is a top plan view of this battery.

The battery shown in the accompanying drawings is described and claimed in the pending joint application Serial No. 570,390 of Le Roy S. Dunham and Ernest O. Jegge (abandoned and continuation-in-part application Serial No. 734,956 filed March 15, 1947, now issued as Patent No. 2,450,472), having a common assignee with the present application, and is herein described for the purpose of illustrating an application in which my invention has particular utility. This battery is a zinc anode—alkaline electrolyte—air-depolarized cell having a liquid-tight container 1, for example of stainless steel, provided with a cover 2 of insulating material such as rubber or suitable plastic. The container has an inwardly-turned bead 3 at the top which forms a seat for the cover. Lying against the inner wall of the container is a sheet 4 of insulation and adjacent the inner side of this insulating sheet is a negative electrode or anode 5 made of zinc. Supported by the cover is a cylindrical positive electrode or cathode 6 which is made of a suitable carbonaceous air-depolarizing material. This cathode has a stud bolt 7 secured to the top portion thereof which forms a terminal therefor. This bolt extends through the cover and is held thereto by an external nut 8. The top portion of the cathode engages a cylindrical recess 9 in the bottom part of the cover and is held tightly at its rim against an interior shoulder 10 of this recess under pressure provided by tightening the nut 8 on the bolt 7, the joint between the cathode and the cover being closed airtight by a suitable sealing material 11. From the recess 9 there extend a series of breather holes 12 through the cover for exposing the cathode to the atmosphere.

In the battery container there is a granular material 13 of dry caustic alkali preferably including in intermixture therewith an electrolyte regenerating material such as calcium hydroxide. After the electrodes are mounted in place and the material 13 is introduced into the container, the cover is sealed at its rim to the container by a suitable sealing material 14. When the battery is to be put into use water is added thereto by way of an opening 15 in the cover having a removable vented cap 16. Until the battery is put in use, however, the vent of the cap 16 is kept sealed by adhesive tape 16a, as are also the breather holes 12 as by adhesive tape 17, so that the material 13 will not be exposed to the elements of the air.

Mounted also on the cover is a terminal structure for the zinc anode which is referred to generally as 18. This terminal structure comprises an exterior terminal 19 made for example of brass. The zinc anode, to which this terminal connects, is commonly amalgamated so as to improve the operating characteristics of the battery. Since brass is an amalgamating material (i. e., capable of being amalgamated) and the terminal is connected through a short length of conductor to the zinc anode, there are encountered serious difficulties in preventing amalgamation and consequent disintegration of the terminal. By my invention, however, the terminal is effectively isolated from contact with mercury of the zinc anode. Also, the terminal construction is hermetically sealed to the cover—which is an important advantage in deferred-action cells containing ingredients which are to be kept out of contact with the air, such as are here described—and is arranged so that it is easy to assemble with the battery components.

Figure 3:
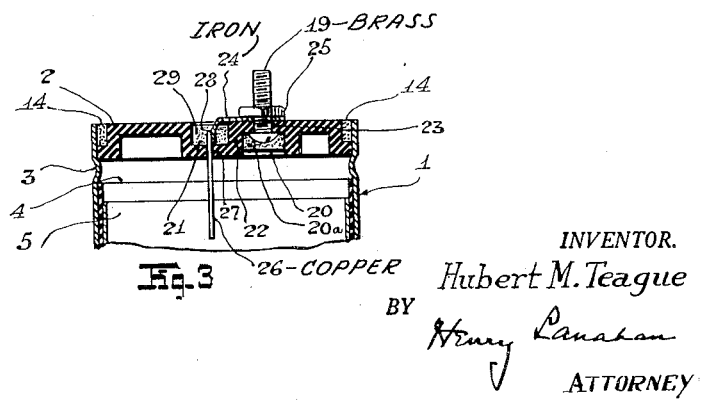
Figure 3 is a sectional view taken substantially on the line 3—3 of Figure 2.

In the preferred arrangement of the terminal construction according to my invention, the cover 2 is provided with an inner recess 20 and with an adjacent outer recess 21 separated by an intervening wall 22 (Figure 3). Extending from the recess 20 through the cover is an aperture 23 to receive the terminal 19. The head of this terminal is disposed within the recess 20 and the threaded shank of the terminal extends through the aperture 23 above the cover. After the terminal is mounted, the inner recess 20 is filled with a sealing material 20a, such as a suitable wax or pitch, so that no part of the terminal will be exposed to the elements within the battery and so that an hermetically sealed joint will be obtained between the terminal and the cover. On the exterior portion of the terminal there is a lug 24 held thereto by a nut 25. This lug 24 terminates within the outer recess 21. Secured to the zinc anode is a lead wire 26 which passes through a small opening 27 in the bottom wall of the outer recess 21, this lead wire being for instance threaded through the opening as the cover is mounted in place. This lead wire is connected by soldering to the lug 24, as at 28, and the outer recess 21 is then filled with a suitable sealing material 29 so as to seal closed the opening 27 and, preferably also, to cover the junction 28 between the lug and the lead wire.

The lead wire 26 is preferably made of copper as copper has the advantage that it will amalgamate with mercury from a zinc anode and, when so amalgamated, is incapable of producing any local battery action with the anode. However, to prevent the copper wire from carrying mercury from the anode to the terminal 19, the lug 24 is made of a non-amalgamating material which is incapable of carrying mercury, such as iron. It may be here parenthetically noted that iron is not suitable for direct connection to the anode because iron in the presence of an alkali electrolyte will have local action with the zinc anode. The iron lug 24 as herein employed is however effectively isolated from the active elements of the battery by the sealing material 29.

A further advantageous feature of the terminal structure hereinabove described is that the terminal 19 and lug 24 may be preassembled with and sealed to the cover. Then as the cover is mounted on the container the lead wire 26 may be threaded through the opening 27 as above explained. After the cover is sealed to the container, the lead wire may be joined to the lug 24 and the recess 21 may be filled with the sealing material 29.

It will be understood that I provide a simple and highly useful terminal structure for primary batteries of the character described, but that I intend no unnecessary limitation of my invention to this particular application. Rather it is submitted that the present embodiment is illustrative and not necessarily limitative of the invention, and that changes and modifications may be made therein without departure from the scope of the invention, which I endeavor to express according to the following claims.

I claim:

1. In a battery having a container and an amalgamated electrode: the combination of a cover for said container having a recess in the inner side thereof and a recess in the outer side thereof offset from said first recess, said recesses leading into respective apertures which extend through said cover; a terminal of amalgamating material mounted in said inner recess and extending through the aperture at said inner recess into the space beyond the outer side of said cover; a first conductive member of amalgamating material connected to said electrode and extending from the inside of said container through the other of said apertures into said outer recess; a second conductive member of non-amalgamating material joined to said first member within said outer recess and connected to an exterior portion of said terminal; and sealing means substantially filling said recesses.

2. In an electrical device having a container and an electrode therein: the combination of a cover for said container adapted to be installed after the device is assembled and having interior and exterior recesses offset from each other and apertures leading from said recesses respectively, a terminal permanently mounted in said inner recess and extending through the aperture at said inner recess into the space beyond said cover, means sealing said inner recess closed to seal said terminal from contact with elements within the container, a conductor at the outer side of said cover secured to said terminal and terminating within said outer recess, a second conductor connected permanently to said electrode and extending loosely through the aperture associated with said outer recess, said conductors being interconnected within said outer recess, and sealing means filling said outer recess for sealing said second conductor to said cover and enclosing the junction of said conductors.

3. A primary cell comprising an amalgamated electrode, an alkaline electrolyte contacting said electrode, a first conductor connected to said electrode and of an amalgamating material free from local battery action with said electrode in the presence of said electrolyte, a terminal outside said cell of an amalgamating material, a second conductor solely connecting said first conductor to said terminal and of a metallic non-amalgamating material for preventing the transport of mercury from said first conductor to said terminal, said second conductor being subject to local battery action with said amalgamated electrode in the presence of said alkaline electrolyte, and means sealing said second conductor from contact with said electrolyte.

HUBERT M. TEAGUE.

REFERENCES CITED

The following references are of record in the file of this patent:

UNITED STATES PATENTS

| Number | Name | Date |
|---|---|---|
| 421,169 | Hewitt | Feb. 11, 1890 |
| 425,818 | McLaughlin | Apr. 15, 1890 |
| 482,979 | Knowles | Sept. 20, 1892 |
| 695,707 | Bugg | Mar. 18, 1902 |
| 768,175 | Fritchle | Aug. 23, 1904 |
| 1,127,935 | Snyder | Feb. 9, 1915 |
| 1,582,567 | Yngve | Apr. 27, 1926 |
| 1,971,275 | Rock | Aug. 21, 1934 |

FOREIGN PATENTS

| Number | Country | Date |
|---|---|---|
| 552,647 | Great Britain | Apr. 19, 1943 |